Jan. 23, 1934.     F. W. LYLE                1,944,751
LIGHT CONTROL SYSTEM
Filed July 18, 1930

INVENTOR
Frederick W. Lyle
BY
ATTORNEY

Patented Jan. 23, 1934

1,944,751

UNITED STATES PATENT OFFICE

1,944,751

LIGHT CONTROL SYSTEM

Frederick W. Lyle, Wilkinsburg, Pa., assignor to Westinghouse Electric & Manufacturing Company, a corporation of Pennsylvania Application July 18, 1930. Serial No. 468,866

2 Claims. (Cl. 240—9)

My invention relates to photo-sensitive apparatus and has particular relation to photo-sensitive devices of the type utilized in regulating illumination.

In illumination-control apparatus constructed and operated according to the teachings of the prior art, of which I am aware, a photo-sensitive device is exposed to the action of the light radiations within the region that is illuminated. A relay, actuated by the photo-sensitive device, adds or removes impedance, associated with the lighting units that illuminate the region, and, consequently, varies the power consumed by the units, thus varying their illuminating intensity.

Illumination engineers have long been aware of the desirability of operating illuminating sources at their rated power. A small decrease below rated value in the power dissipated by an illuminating source results in a comparatively large decrease in the intensity of the illumination which it radiates. On the other hand, if the power dissipated is increased above the rated value, the source (particularly if it is an incandescent lamp) has a comparatively short life.

It is seen then that the operation of light sources in connection with a regulating device suggested by the teachings of the prior art, involves, not only an excessive consumption of power, but also the frequent replacement of lighting units and the nuisance and expense associated therewith.

It is, accordingly, an object of my invention to provide regulated lighting apparatus wherein the sources are always operated at their rated power values.

Another and more specific object of my invention is to provide a plurality of lighting units for illuminating a region which shall be so related to a device, responsive to the state of illumination within the region, that a predetermined fraction of the units are in a completely unexcited condition, the remainder of the units being in an excited condition.

An additional specific object of my invention is to provide regulating apparatus for a lighting system, illuminating a region, whereby the number of units in the system that are in an excited state is continually varied in response to the state of illumination within the region.

A further specific object of my invention is to provide regulating apparatus for a lighting system, illuminating a region, whereby the number of units in the system, that are in an excited state, is increased if the state of illumination within the region falls below a predetermined lower limit, and the number of units in the system, that are in an unexcited state is increased, if the illumination rises above a predetermined upper limit.

More concisely stated, it is an object of my invention to provide an automatically regulated illuminating system of a type wherein the lighting units are either operated at their rated power values or are entirely inactive.

According to my invention, I provide a photo-sensitive device exposed to the combined natural and artificial illumination within a region that is artificially illuminated by a plurality of lighting units connected in individual circuits. A contactor, actuated from the photo-sensitive device is so disposed relative to the circuits of the lighting units that it gradually closes or opens the circuit in response to the condition of the illumination within the region.

In a preferred embodiment of my invention, the contactor is of a reciprocating nature and its instantaneous position is dependent upon the instantaneous state of the illumination within the region.

In a modification of my invention, the contactor is of a rotary nature and is operated by a motor, the direction of rotation of which depends on the bi-polar variation of the illumination about a predetermined set of limiting values.

The novel features that I consider characteristic of my invention are set forth with particularity in the appended claims. The invention itself, however, both as to its organization and its method of operation, together with additional objects and advantages thereof, will best be understood from the following description of specific embodiments, when read in connection with the accompanying drawing, in which:

Figure 1:
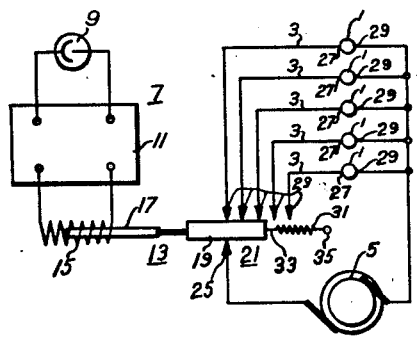
Figure 1 is a schematic view showing a specific embodiment of my apparatus.

The apparatus shown in Fig. 1 comprises a plurality of lighting units 1 connected in individual circuits 3 and capable of being operated from a generator 5. The lighting units 1 are so disposed within a region that is partly illuminated by them and partly illuminated from natural sources as to provide most efficient lighting therefor.

A photo-sensitive device 7, including a photo-sensitive cell 9, an amplifier 11 and a relay 13, the exciting coil 15 of which is connected in the output circuit of the amplifier 11, is located within the region in such position that the photo-cell 9 receives a fair average of the total illuminating intensity existing on the surfaces therein. It is obvious, of course, that the photo-sensitive cell 9 should be exposed to the aggregate of the artificial and natural illumination existing within the region.

The relay 13, operated from the amplified current of the photo-cell 9, comprises a movable core 17, rigidly fastened to the movable element 19 of a contactor 21, the fixed elements 23 and 25 of which are conductively connected to the terminals 27 and 29 of the sources 1. The movable element 19 of the contactor 21 is urged in such a direction that it completes the circuits of the lighting units 1 by a spring 31, fastened to it at one end 33 and to the walls of the container of the relay 13 at the other end 35. It is urged in the opposite direction by the electromagnetic interaction of the exciter coil 15 of the relay 13 and its core 17.

It is seen that, as the intensity of illumination affecting the cell 9 increases, the number of active lighting units decreases.

It is to be noted that, in a system of the type shown in Fig. 1, the position of the movable element of the contactor is continuously varied in response to the state of excitation of the photo-sensitive device. In apparatus of the type shown in Fig. 2, the contactor is of a rotary type and its position is varied only when the illumination affecting the photo-cell increases above one predetermined value or falls below a second predetermined value.

The apparatus shown in this view comprises a plurality of lighting units 37, providing for the illumination of a region, which are operated from a power source 39, in this case, shown as a battery of cells. The circuits through the sources may be closed by a conducting sector 41 that is rotated by a motor 43 and completes the circuits through a plurality of fixed contacts 42. The field windings 45 of the motor 43 are connected in series with the fixed contacts 47 and 49 of a relay 51, the exciting coil 53 of which is traversed by the amplified current from a photo-cell 9 which is exposed to the total illumination within the region illuminated.

The relay 51 is equipped with a single movable contactor 55 that is urged to make contact with one set of fixed contactors 47 by a spring 57 fastened thereto and is urged to engage the two remaining fixed contacts 49 by the electro-magnetic action of the current through the exciting coil 53 of the relay.

The contacts 47 and 49 are so connected in the circuit of the field coil 45 of the motor 43 that, when the circuit through one set of contacts 47 is completed, the current through the field coil 45 flows in one direction, while, when the circuit through the remaining set of contacts 49 is completed, the current through the field coil 45 flows in the opposite direction. On the other hand, the polarity of the voltage source 59 impressed between the terminals of the armature 60 of the motor 43 is independent of the condition of the contactors 47 and 49. Hence, for one closed position of the relay 51, the motor 43 rotates in one direction while, for the remaining closed position of the relay 51, it rotates in the opposite direction. The direction of rotation of the motor 43 is so adjusted that, when the photo-cell 9 is excessively excited, the circuits 61 of the lighting units 37 are opened while, when the photo-cell 9 is underexcited, the circuits 61 of the lighting units 37 are closed. Thus, the illumination within the region is maintained between predetermined limits which may be made as wide as is found desirable.

It is to be noted that a system of illumination constructed and operated according to my invention has been shown and described hereinabove with an emphasis on its essential features only. By reason of the fact that it was deemed inadvisable to unnecessarily complicate the specification, the improvements and additions that are ordinarily added to light-control systems were not shown or described. Such additions and improvements are, for example, specifically described in a copending application Serial No. 301,415 to Dewey D. Knowles filed August 22, 1928 and assigned to Westinghouse Electric & Manufacturing Company and in another copending application Serial No. 433,493 to Edwin H. Vedder and Roland F. Huges filed March 5, 1930 and assigned to Westinghouse Electric & Manufacturing Company. The addition of these improvements to my apparatus and incorporation of them in systems constructed according to my invention will be apparent to persons skilled in this art.

Figure 2:
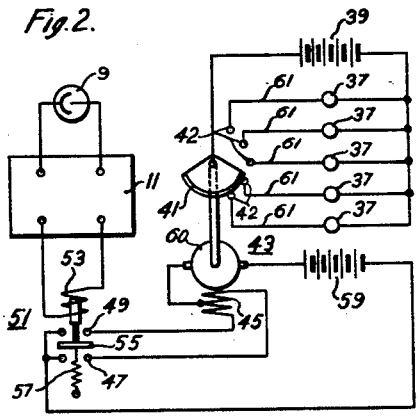
Fig. 2 is a schematic view showing a modification of my invention wherein a rotating contactor is utilized.
Figure 3:
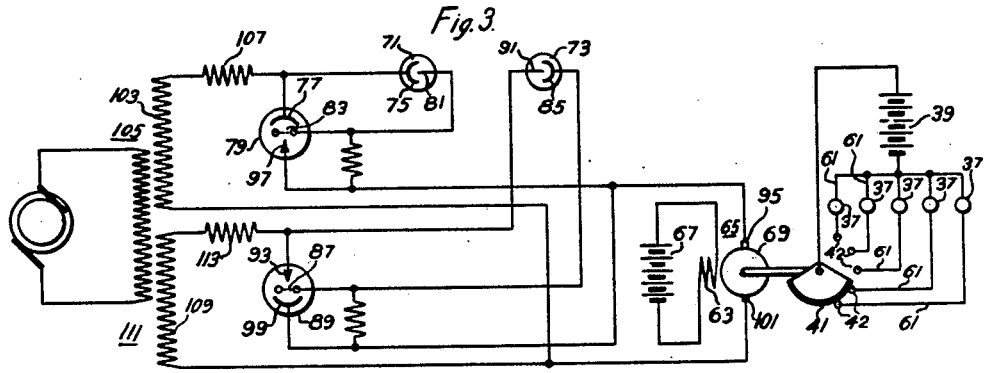
Fig. 3 is a schematic view showing another modification of my invention wherein a rotating contactor is utilized.

In Fig. 3, apparatus of a type functionally similar to the apparatus shown in Fig. 2, is illustrated.

The lighting circuit and the rotating contactor are substantially like those which are employed in apparatus of the type shown in Fig. 2. In the present modification, however, the field windings 63 of the motor 65 are excited from an independent power source 67, such as a battery, while the armature 69 of the motor 65 is excited from a photo-sensitive system analogous to the compensating apparatus of the type described in a copending application Serial No. 461,511 of Hymen Diamond filed June 16, 1930 and assigned to Westinghouse Electric & Manufacturing Company.

The photo-sensitive circuit associated with the apparatus described in this view, includes a plurality of photo-cells 71 and 73. The cathode 75 of certain of the cells 71 are connected to the cathode 77 of an electronic-discharge tube 79 (such as a grid-glow tube), while their anodes 81 are connected to the grid 83, of the tube 79. The cathodes 85 of the remainder of the cells 73 are connected to the grid 87 of a second tube 89, and their anodes 91 are connected to the anode 93 of the tube 89.

One pole 95 of the armature 69 of the motor 65 is directly connected to the anode 97 of the former tube 79 and to the cathode 99 of the latter tube 89. The remaining pole 101 of the motor 65 is connected to the cathode 77 of the former tube 79 through the secondary 103 of the transformer 105, through which power is transmitted to the tube 79 and through a limiting impedance 107, and to the anode 93 of the latter tube 89 through the secondary 109 of the transformer 111 through which power is transmitted to the tube 89, and also through a limiting impedance 113.

It is seen that, as the illumination on the cells 71 connected between the grid 83 and the cathode 77 of one tube 79, increases, the potential drop between the grid 83 and the cathode 77 of the tube 79 decreases, while, as the state of excitation of the remaining cells 73 increases, the drop in potential between the grid 87 and the cathode 93 of the remaining tube 89 increases. As a result, the former tube 79 breaks down for a low state of excitation of the cell 71, associated with it, and causes the motor 65 to rotate in one direction while, for a high state of excitation of the cell 71 associated with it, the remaining tube 89 breaks down, causing the motor 65 to rotate in the opposite direction. The direction of rotation of the motor is so adjusted that the contactor 41, rotated thereby, closes the circuits 61 of the lighting units 37 when the illumination in the region is low, and opens the circuits 61 when the illumination is high.

Figure 4:
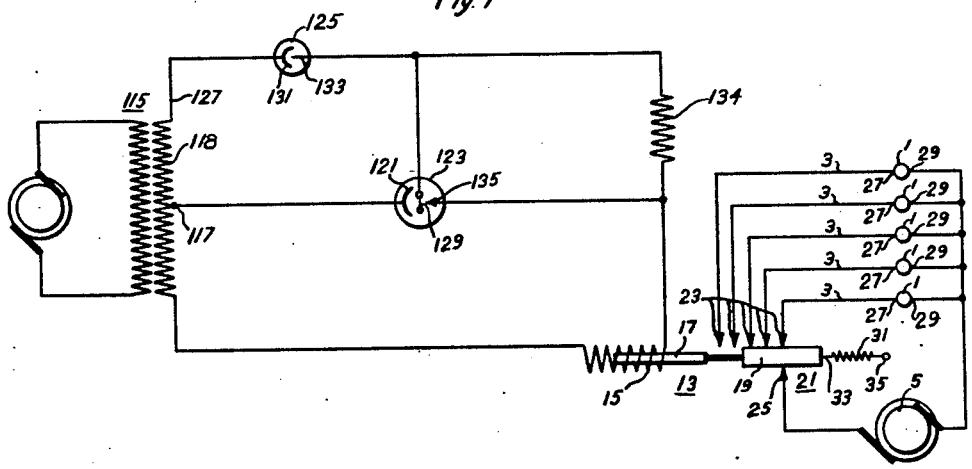
Fig. 4 is a schematic view showing a modification of my invention wherein a reciprocating contactor is utilized.

Apparatus of the type shown in Fig. 4 is a modification of the apparatus of the type shown in Fig. 1. The circuits 27 of the lighting units 1 and the contactor 21 are substantially like those in the apparatus of Fig. 1. The exciting circuit for the contactor 21, however, is specifically described and explained in a copending application Serial No. 461,617 to Myron J. Brown, filed June 16, 1930, and assigned to Westinghouse Electric & Manufacturing Company.

The exciting circuit for the relay 13 includes a power-transmission transformer 115, to the mid-tap 117 of the secondary 118 of which the cathode 121 of an electron-discharge tube 123 is connected. A photo-cell 125, exposed to the light within the region which is illuminated, is connected between one terminal 127 of the secondary 119 of the transformer 115 and the grid 129 of the tube 123, the cathode 131 of the cell 125 being connected to the secondary 119 of the transformer 115, and the anode 133 of the cells 125 being connected to the grid 129 of the tube 123. An impedance 134 is connected between the grid 129 of the tube 123 and the anode 135 thereof.

As the impedance of the cell 125 varies, the phase of the voltage between the grid 129 and the cathode 121 of the tube 123 varies relative to the phase between the anode 135 and the cathode 121 of the tube 123. As a result, the magnitude of the current traversing the tube 123, when it breaks down, varies in accordance with the state of excitation of the photo cell 125 and decreases as the state of excitation of the cell increases. Consequently, the magnetic force acting on the contactor 21 is varied in accordance with the condition of illumination existing within the lighted region, and increases as the illumination in the region decreases.

In Figs. 3 and 4, grid-controlled glow tubes are shown as embodied in the apparatus. These should be regarded as only symbolical of any electron-discharge tube or mercury-vapor tube that it may be desirable to utilize in the apparatus.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In combination with a plurality of separate light sources for illuminating a given area, each light source operating at substantially rated potential, a source of energy for said light sources, switch means for controlling said light sources comprising a separate contact connected to each light source, a movable contactor biased to connect all said contacts to said source of energy, a solenoid arranged when energized to pull said contactor against its bias, photo-electric means responsive to the illumination of said area to increase the energizing current through said solenoid as said illumination increases, said contacts and movable contactor being so disposed that movement of said contactor against its bias successively disconnects said contacts from said source of energy.

2. In combination with a plurality of separate light sources for illuminating a given area, each light source operating at substantially rated potential, a source of energy for said light sources, switch means for controlling said light sources comprising a separate conductor connected to each light source and means for varying the number of said conductors connected to said source of energy, the last said means being biased to connect all said conductors to said source of energy, photo-electric means responsive to the illumination of said area to oppose said bias with increasing force as said illumination increases, and to thereby successively disconnect said conductors from said source of energy.

FREDERICK W. LYLE.